United States Patent [19]

Ko et al.

[11] Patent Number: 5,091,452
[45] Date of Patent: Feb. 25, 1992

[54] CHARGE DISSIPATIVE SURFACE COVERINGS

[75] Inventors: Kenneth K. Ko, West Grove; Jesse D. Miller, Jr., Lancaster; Susan M. Von Stetten, Landisville, all of Pa.

[73] Assignee: Armstrong World Industries, Inc., Lancaster, Pa.

[21] Appl. No.: 303,256

[22] Filed: Jan. 30, 1989

[51] Int. Cl.$^5$ ............................................. C08K 5/41
[52] U.S. Cl. ................................... 524/155; 524/156; 524/157; 524/914
[58] Field of Search ................ 524/155, 156, 157, 914

[56] References Cited

U.S. PATENT DOCUMENTS

| | | | |
|---|---|---|---|
| 3,117,113 | 1/1964 | Tudor | 524/156 |
| 3,404,138 | 10/1968 | Adams | 260/92.8 |
| 3,445,440 | 5/1969 | Susi et al. | 524/156 |
| 3,852,255 | 12/1974 | Bentz et al. | 260/88.7 R |
| 3,891,718 | 6/1975 | Wolf et al. | 260/859 R |
| 3,893,979 | 7/1975 | Wolf et al. | 260/77.5 AQ |
| 3,911,047 | 10/1975 | Wolf et al. | 260/859 R |

FOREIGN PATENT DOCUMENTS 1152947  5/1969  United Kingdom .

*Primary Examiner*—Paul R. Michl
*Assistant Examiner*—John J. Guarriello

[57] ABSTRACT

Quaternary ammonium salt antistatic agents having an organic chain of ten to twenty-five atoms plasticize the vinyl resin of a static charge dissipative surface covering. Such antistatic agents minimize migration and therefore retain their charge dissipative properties for a longer period of time. The class of plasticizing quaternary ammonium salt antistatic agents includes derivatives of unsaturated organic acids and alkyl ethers having a chain length of six to eighteen carbon atoms and a hydroxyl functionality.

1 Claim, No Drawings

CHARGE DISSIPATIVE SURFACE COVERINGS

SUMMARY OF THE PRESENT INVENTION

The present invention relates to surface covering products. In particular, the present invention relates to surface covering products having static dissipative electrical properties.

BACKGROUND OF THE INVENTION

Static control problems have been recognized and routinely addressed for years in the electronic manufacturing industries. As the miniaturization of electrical equipment progresses and the growth of the electronic industry continues, static control problems have become more and more a subject of serious concern to the electronic industry. To put the problem into perspective, it is known that someone walking across a carpeted floor can accumulate more than 30,000 volts of static charge, while published literature has referred to 25 to 100 volts as critical static discharges which could cause immediate and catastrophic damage to a sensitive electronic chip. This demonstrates the need for protecting the areas and environments where sophisticated electronics equipment are manufactured and stored.

It has been generally recognized that the prevention of static discharge requires that the total manufacturing and storage environment be constructed of materials which are capable of dissipating static charges, and that these materials be connected to a common ground. In such an environment, it is critically important that surfaces, in general, and the flooring structure, in particular, be protected against electrostatic discharge.

It has long been known that polymeric materials, of the kinds typically employed in floor coverings, such as polyvinyl chloride, are normally insulative. They can be made conductive, however, by incorporating either a conductive filler or an antistatic agent in the polymer structure or by employing both methods at the same time. When conductive fillers, such as metallic materials or carbon blacks, are used, the filler concentrations required to impart conductivity to the polymer structure are usually relatively high, typically thirty to fifty percent by volume. At such concentrations, the appearance of the polymeric structure is usually black, gray, or brown, depending upon the materials employed, and are not suitable for highly decorative floor covering applications.

To protect a floor covering from accumulating dirt and to improve the lustre or glossiness of a floor covering, a floor polish is often used as a maintenance aid. For most commercial conductive floor tiles or sheet materials, especially those made with carbon and other metallic materials, i.e., commercially available carbon veined tiles and the like, such maintenance aids are not recommended by the manufacturers. This is because most commercially available floor polish materials are insulative. They will interfere with the conducting path formed by the carbon particles, or other metallic materials therein, affecting the ability of the conductive floor covering to dissipate static charges.

For similar reasons, even a conductive floor polish is often not recommended for use in the maintenance of conductive floors, such as those employing carbon-veined tiles. This is typical because the conductive floor polish is not usually as conductive as the conductive floor covering itself. In addition, the residual polish worn away by traffic also interferes with the conducting path, further decreasing the charge dissipative efficiency of the conductive floor covering.

Antistatic agents, such as those containing quaternary ammonium salt functionalities have been known to impart charge dissipative properties to floor coverings in the past. However, these antistatic materials are sensitive to moisture and, in previous uses, have affected the manufacturing processing characteristics and performance characteristics of the floor coverings in which they were employed. For example, a floor covering containing moisture absorptive materials might swell or grow in length where water is present. If the moisture growth is high, the floor covering might curl or buckle, causing what is commonly referred to as a peak-seam in an installed floor covering. High moisture growth is, therefore, generally considered to be a high risk with respect to the performance of floor coverings, particularly when installed on on-grade or below-grade concrete sub-floors.

Further, the antistatic properties of the prior art surface coverings, in particular floor coverings, are relatively short lived. The antistatic agents of the prior art floor coverings tend to migrate and are removed from the floor surface by conventional cleaning procedures. In as short a period as one or two years, the antistatic property of a floor covering is markedly reduced.

OBJECTS OF THE PRESENT INVENTION

It is an object of the present invention to provide a surface covering product having static dissipative electrical properties suitable for highly decorative floor tile applications.

It is a still further object of the present invention to provide a surface covering product having static dissipative electrical properties without the moisture growth problems typical of antistatic agents.

Another object of the present invention is to provide a surface covering product which retains its static dissipative electrical properties for a longer period of time than the prior art charge dissipative surface coverings.

According to the present invention, there is provided a surface covering product having static dissipative electrical properties, which surface covering product comprises a vinyl resin and an antistatic agent capable of plasticizing the vinyl resin. The molecules of such an antistatic agent are physically intertwined with the molecules of the vinyl resin. Therefore, migration is mitigated and the level of antistatic characteristics is retained despite repeated washings. Further, the level of conventional plasticizer can be reduced.

DETAILED DESCRIPTION OF THE PRESENT INVENTION

By far, the predominant form of resilient flooring used today is of the vinyl type. That is, flooring which has a binder system based on polyvinyl chloride, commonly referred to as PVC. This polymer by itself is a very hard, tough, virtually intractable, thermoplastic material that must be compounded with various additives to produce economically useful products. It is one of the most adaptable polymeric materials and is used for applications as widely divergent as rigid pipe to almost jelly-like fishing lures. Because of this adaptability it is well suited to the manufacture of both flexible and semi-rigid flooring materials.

The high molecular weight and chemical and physical nature of polyvinyl chloride allow it to accommodate relatively large amounts of inert filler and it can be plasticized effectively and permanently to create materials with a wide range of flexibilities. Polyvinyl chloride is inherently resistant to acids, alkali and many organic solvents. It does not hydrolyse even when in continuous contact with moisture. Because of its chlorine content, the polymer is also inherently fire resistant and as a plastic material is generally classified as self-extinguishing. Plasticized material is less fire resistant than rigid PVC, but can usually be formulated for use as a floor covering to pass the flame spread and smoke generation limitations of most building codes.

When properly compounded and processed, PVC can be a clear, colorless material or pigmented to produce the full range of colors in transparent or opaque forms.

Polymeric material, as used throughout this specification, is intended to include polyvinyl chloride in its various forms. The vinyl resins used in floor coverings may be homopolymers, i.e., polymers consisting of only vinyl chloride units, or copolymers, consisting of vinyl chloride and other structural units, such as vinyl acetate. The molecular weights of these resins typically range from about 40,000 to about 200,000 atomic mass units. The higher molecular weight polymers have greater ultimate tensile strength and abrasion resistance and are generally used in flooring wear layers, while the lower molecular weight polymers are most useful in producing foams for cushioned flooring. As a general rule, vinyl homopolymers are typically used in vinyl sheet goods and Type III solid vinyl tile, while Type IV vinyl composition tiles typically contain copolymers of vinyl chloride and vinyl acetate.

To protect the polymeric material from degredation during processing and during its use as flooring material, vinyl compounds must be stabilized against the effects of heat and ultraviolet radiation. The most common stabilizers used in flooring are soaps of barium, calcium and zinc; organo-tin compounds; epoxidized soy bean oils and tallate esters; and organic phosphites.

Polymeric materials for flooring uses, even for use in relatively rigid Type IV vinyl composition tiles, contain plasticizers to provide flexibility and to facilitate processing. The most frequently used plasticizer is dioctyl phthalate (DOP). Others that may be found in flooring use include butylbenzyl phthalate (BBP), alkylaryl phosphates, other phthalate esters of both aliphatic and aromatic alochols, chlorinated hydrocarbons, and various other high boiling esters. The selection of the proper type and amount of plasticizer is often critical in the formulation of flooring compounds because of the interaction of flexibility requirements, resistance to staining, reaction with maintenance finishes, and processing requirements.

In most tile and sheet flooring, the stabilized and plasticized vinyl formulation is mixed with varying amounts of inorganic filler to provide mass and thickness at a reasonable cost. The most common filler typically found in flooring is crushed limestone (calcium carbonate). Others that may be employed include talcs, clays and feldspars. In addition to providing bulk at reasonable cost, the use of inorganic fillers in flooring structures provides increased dimensional stability, resistance to cigarette burns, improved flame spread ratings and reduced smoke generation.

Pigments are used in flooring products to provide both opacity and color to the finished products. The typically preferred white pigment is titanium dioxide and colored pigments are preferably inorganic. Certain colors only available as lakes, such as the phthalocyanine blues and greens, must be resistant to the effects of alkali and light fading.

Finally, in order to pass certain code requirements with regard to fire and smoke properties various additives may be employed to reduce flame spread and smoke generation ratings. These compounds include alumina trihydrate, antimony trioxide, phosphate or chlorinated hydrocarbon plasticizers, zinc oxide, and boron compounds. Cushioned flooring containing chemically expanded foam is usually compounded with azobisformamide blowing agents. Various other processing aids and lubricants may also be employed.

Many antistatic chemicals now available in the marketplace are not compatible with plasticized PVC compositions. They tend to interfere with the consolidation of the vinyl resin causing problems in the manufacturing process and undesirable performance properties in the final floor structure.

Antistatic floor coverings which include carbon black in the wear layer are not desirable because the carbon black limits the decorative design capability of the final product and the abrasion of the carbon black often leads to a reduction in conductivity. A base material can be a carbon-filled vinyl composition or a carbon-filled paper structure which are suitable for use in a sheet floor manufacturing process. A typical vinyl structure containing carbon is given in Table I.

TABLE I

| Typical Formulation for Carbon-Filled Vinyl Base Composition | |
|---|---|
|  | Parts by Weight |
| Limestone | 1130.5 |
| PVC Resin | 290.0 |
| Hydrocarbon Resin | 27.0 |
| Plasticizer | 75.0 |
| Stabilizer | 10.0 |
| Carbon Black | 90.0 |
| Zirconata Coupling Agent | 5.0 |

While more carbon in the composition yields higher conductivity, it is most desirable that the carbon concentration be in the range of about 5% to about 10% by weight of the total formulation. This range of carbon loading results in a base structure with a resistivity of about $10^5$ ohm/sq or lower without causing processing problems. As known in the art, the processing of such a base material can be done by mixing the formulation in a mechanical mixer such as a Banbury mixer, a Farrel mixer or a Baker-Perkins mixer. After the composition is well mixed, a heated roll press can be used to consolidate the structure into a sheet form.

The base material can also be a conductive paper made with carbon black. Such a paper should possess physical properties suitable to be used as a carrier in a sheet floor manufacturing process. The base material can also be a conventional tile base with carbon black to give it the desired conductive property.

The top layer of the composite structure of the prior art may be a PVC formulation in which a quaternary ammonium antistatic agent is incorporated. However, no known prior surface covering includes the specific class of quaternary ammonium antistatic agent of the present invention.

The antistat of the present invention can be incorporated homogeneously in the top layer or it can be added to part of the vinyl structure which is formed into chips and randomly mixed with other nonconductive chips to form the top layer. In another embodiment, one of the conductive or non-conductive components can be in the form of a free-flowing dry blended composition while the other component is in chip form. The conductive portion of the top layer can also be in the form of marblized streaks throughout the top layer or in a portion of the chips forming the top layer.

When both the conductive and non-conductive components are chips, generally ⅛" to ¼" in size, the conductive component should be no less than 30% by weight to maintain an effective charge dissipative characteristic in the final product. It is even more preferable that the conductive component be no less than 40% by weight. The same preferable percentage of conductive component applies when the top layer is formed from conductive chips and non-conductive powder resin.

When the conductive component is a free-flowing dry blended powder and the non-conductive component is in chip form, the concentration of the conductive component can be much less. However, the non-conductive chips should be not much larger than about ¼" in size. The amount of the conductive powder composition should be great enough to form a conductive path throughout the bulk of the top layer from the top surface to the conductive base material.

As it is known in the art, quaternary ammonium compounds are used as antistatic chemicals since they acquire conductivity through the absorption of moisture from the air. However, as previously discussed, most of the quaternary ammonium antistats tend to migrate within the consolidated PVC composition. This not only results in a non-uniform distribution of the antistat in the PVC layer since the antistat migrates to the surface exposed to air moisture, the antistatic characteristics of the PVC layer is reduced as the antistat is washed away during cleaning of the surface covering.

Surprisingly, it has been found that a certain class of quaternary ammonium compounds will plasticize PVC resins. These compounds yield many unexpected advantages. Not only can the desired level of plasticizing be obtained with less conventional plasticizer, the conductivity of the PVC layer is more uniform and is retained over a period of time which is many times greater than that of the typical quaternary ammonium.

The class of quaternary ammonium compounds of the present invention are quaternary ammonium salts having an organic chain 10 to 25 atoms long. The long organic chain enables the individual molecules to physically intertwine with the molecules of the PVC resin. This plasticizes the PVC resin and mitigates the migration of the antistat.

The organic chain length must be long enough to permit the molecules to intertwine sufficiently. However, too long a chain length is undesirable since such molecules cannot be efficiently dispersed to allow a uniform distribution of the antistatic agent. The preferred length of the organic chain, which may include non-carbon atoms such as oxygen, nitrogen and sulphur, is 10 to 25 atoms.

Two types of antistatic molecules have been discovered which are capable of plasticizing the vinyl resin. The first are derivatives of unsaturated organic acids including palmitoleic acid, oleic acid, linoleic acid and linolenic acid. Such acids are included in cocoa and soybean oil.

The other type of preferred quaternary ammonium salt has a hydroxy functionality and the organic chain includes an alkyl ether containing 6 to 18 carbon atoms. A preferred length of the alkyl ether chain is 8 to 10 carbon atoms. The hydroxy functionality in combination with the quaternary ammonium moiety contributes to the antistatic properties of the PVC composition.

The preferred quaternary ammonium salt is an alkyl sulfate, preferably methyl sulfate, ethyl sulfate or propyl sulfate. The most preferred salt is ethyl sulfate.

Typical quaternary ammonium salts of the present invention include soyadimethylethyl ammonium ethosulfate, soya ethyldiammonium ethosulfate, soyadimethylammonium diethylphosphate, an hydroxy derivative of laurylether quaternary ammonium ethylsulfate, an hydroxy derivative of laurylether quaternary ammonium methylsulfate and an hydroxy derivative of cocoether quaternary ammonium ethylsulfate.

To have the desired charge dissipative properties, at least a portion of the wear layer should have the antistatic agent of the present invention comprising about 1% to about 5% by weight of the portion of the vinyl resin layer. As discussed previously, the antistatic agent may be uniformly distributed throughout the layer, or in vinyl chips which are consolidated with vinyl chips having no antistatic agent to form the vinyl layer, or as a component of a free-flowing dry blended powder which is consolidated with non-conductive vinyl chips. If the antistatic agent is uniformly distributed throughout the vinyl resin wear layer, it is preferred that the antistatic agent be about 2% to 4% by weight of the layer. In whatever manner the antistatic agent is distributed within the vinyl resin wear layer, it should have a surface resistivity of no greater than $10^{10}$ ohm/sq at 15% RH.

As discussed previously, not all of the quaternary ammonium antistatic agents have the desirable feature of plasticizing PVC resin. An example of an antistatic agent which will plasticize PVC is Larostat G-13-148, sold by Mazer Chemical Company. Larostat G-13-148 is N,N-Bis(2-hydroxyethyl)-N-(3'-dodecyloxy-2'-hydroxypropyl)-ethyl ammonium ethyl sulfate having the formula:

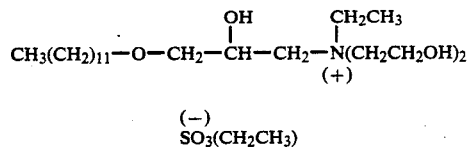

Larostat 264-A also acts as a plasticizer. Larostat 264-A is a soyadimethylethyl ammonium ethosulfate. It is a derivative of the unsaturated acids forming the soybean oil.

Other antistatic agents which are believed to be capable of plasticizing PVC include Larostat 477, which is N-cocoa-dihydroxyethyl-ethyl ammonium ethyl sulfate having the formula:

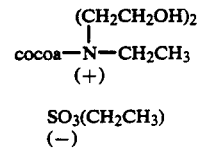

Examples of antistatic agents which do not plasticize PVC include Hexcel 106G which is sold by Hexcel Chemical Products and Cyastat LS from American Cyanamid Co. Hexcel 106G is N,N-bis-(2-hydroxyethyl)-methyloctanaminium 4-methyl-benzene sulfonate having the chemical formula:

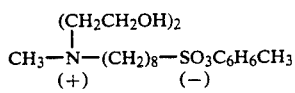

Cyastat LS is (3-lauramidopropyl)trimethylammonium methylsulfate having the formula:

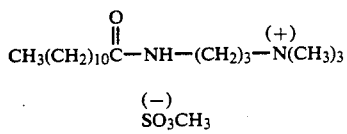

Other antistatic agents which are not included within the present invention include Larostat SC which is stearamidopropyl dimethyl 2-hydroxy ethyl ammonium chloride having the formula:

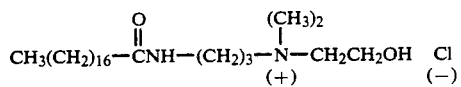

Two additional antistatic compounds from Mazer Chemical Company, Jordaquat 350 and Jordaquat 358, both described as benzalkonium chloride, are not good PVC resin plasticizers.

In the following examples which illustrate the concepts of the present invention, the surface resistivity was measured according to ASTM D-257. Unless otherwise indicated, all parts are by weight.

EXAMPLE 1

A carbon black/vinyl resin base structure was prepared by mixing the composition listed in Table I in a Baker-Perkins mixer and sheeting the structure in a heated two-roll mill at about 320° F. The resistivity of the base structure which was obtained was measured as $2.2 \times 10^5$ ohm/sq.

Independently, conductive and non-conductive vinyl compositions were prepared using the components listed in Table II.

TABLE II

|  | Non-Conductive Vinyl Composition (Parts By Weight) | Conductive Vinyl Composition (Parts By Weight) |
|---|---|---|
| Vinyl Resin | 192.5 | 192.5 |
| Hydrocarbon Resin | 15.0 | 15.0 |
| Plasticizer | 48.9 | 40.0 |
| Stabilizer | 9.0 | 9.0 |
| Pigment Fillers | 27.0 | 27.0 |
| Limestone | 1193.7 | 1193.0 |
| Antistat (Mazer Chemical's Larostat 264A) | 0 | 23.5 |

After mixing and consolidating the compositions, they were ground and sieved into chips. Fifty percent by weight of both the conductive and nonconductive chips, having sizes in the range between 14 mesh to 30 mesh, were mixed mechanically without heat.

The conductive carbon filled vinyl base material prepared earlier was prefabricated to the thickness of about 3/32". The mix chips were uniformly laid on top of the vinyl base and the composite structure was consolidated together by heat pressing (320° F. at 1000 psi for two minutes) in a metal frame. The final structure had a thickness of ⅛" with a surface resistivity (measured on the top layer) of the $1.3 \times 10^8$ ohm/sq at 45% RH and $1.3 \times 10^9$ ohm/sq at 15% RH. The moisture growth of this structure, as tested by immersing a sample in water at 73.5° F. for seven days, was 0% as compared to 2.4% for conductive floor structure without the carbon filled vinyl base.

EXAMPLE 2

The base material and the process used in this example were similar to those in Example 1. The size of the conductive and non-conductive chips were in the range between 3 mesh and 14 mesh. After consolidating the top and base structures, the final material showed a surface resistivity of $7 \times 10^7$ ohm/sq at 45% RH and $4 \times 10^8$ ohm/sq at 15% RH. This structure also had excellent resistance to moisture growth.

EXAMPLE 3

A vinyl composition consisting of 70% limestone filler and 30% plasticized PVC homopolymer was processed into a consolidated structure. The homopolymer was a GP grade PVC with 30 to 50% dioctyl phthalate (DOP). The vinyl composition was ground to between 12 to 40 mesh in size. These particulates are hereinafter referred to as vinyl fines.

Independently, a fluff material consisting of the composition given below was prepared.

| PVC/PVA copolymer (10–20% PVA) | 34.4 parts |
|---|---|
| DOP plasticizer | 2.5 parts |
| Epoxidized soya oil lubricant | 2.0 parts |
| Barium stearate stabilizer | 0.3 parts |
| Soyadimethylethyl | 5.3 parts |

A low shear Hobart mixer was used to blend the components together. After this composition was mixed for ten minutes, 154 parts of vinyl fines previously prepared were added to the fluff material and mixing was continued until a homogeneous mixture was obtained. A 3/32" thick layer of the final mixed material was laid on the carbon-filled vinyl base structure described in Example 1 and the structure was consolidated using a heat process (300° F. and about 600 psi). The resultant structure had a surface resistivity of $4 \times 10^7$ ohm/sq at 50% RH and $5.2 \times 10^8$ ohm/sq at 15% RH. The structure had 0% moisture growth resistance.

EXAMPLE 4

The same top layer composition as that described in Example 3 was used in this example. The base structure was a carbon-filled felt material having a resistivity of $5 \times 10^4$ ohm/sq. After consolidating the mixture of the vinyl fluff and fines as in Example 3. The final structure had a surface resistivity of $2 \times 10^8$ ohm/sq at 50% RH and $1 \times 10^9$ ohm/sq at 15% RH. The moisture growth of this sample was 1.1%.

EXAMPLE 5

This example compares the use of different antistatic chemicals in preparing the charge dissipative vinyl structures of the present invention. Since antistatic chemicals are used mainly in the top layer of the final composite structure (the bottom layer is either a carbon-filled PVC based material or a carbon filled felt material), only compositions of the top layer were compared. The amounts of the components are in grams.

TABLE III

|  | Control 1 | Control 2 | #1 | #2 | #3 | #4 | #5 |
|---|---|---|---|---|---|---|---|
| Vinyl fines | 612.5 | 612.5 | 612.5 | 612.5 | 612.5 | 612.5 | 612.5 |
| PVC/PVA copolymer | 137.5 | 137.5 | 137.5 | 137.5 | 137.5 | 137.5 | 137.5 |
| DOP plasticizer | 22.5 | 22.5 | 22.5 | 22.5 | 10.0 | 10.0 | 10.0 |
| Epoxidized soya oil | 14.5 | 14.5 | 14.5 | 14.5 | 8.0 | 8.0 | 8.0 |
| Barium stearate stabilizer | 0.7 | 1.0 | 0.7 | 1.0 | 1.0 | 1.0 | 1.0 |
| Larostat 264-A antistat | — | — | — | 21.0 | — | — | — |
| Larostat G-13-148 antistat | — | — | 21.0 | — | 21.0 | — | — |
| Hexcel 106G antistat | — | — | — | — | — | 21.0 | — |
| Cyastat LS antistat | — | — | — | — | — | — | 21.0 |

A low shear Hobart mixer was used to prepare each of the fluff compositions listed in Table III. Total mixing time in the Hobart mixer was ten minutes. After the fluff composition was homogeneously mixed, the mixture was transferred and consolidated between two chromed plates. A 3/32" metal frame was employed to fix the amount of fluff used and a roll-bar was used to pack the material. After the fluff was well packed, the metal frame was removed. Consolidation of the fluff material was done in a press. The top platen of the press was preset at 300° F. and the bottom platen was left cold. The consolidation process involved three steps: (1) pressing the fluff for ten seconds to 300 psi, (2) slightly opening the press for about 15 seconds to release the trapped air, and (3) fusing the structure at 3,300 psi for ten seconds.

Observations made on the samples during and after the processing of the vinyl structures are shown in Table IV.

and in elongation than the control. Again, these results demonstrate that the Larostat 264-A and Larostat G-13-148 are plasticizing the vinyl composition and both Cyastat LS and Hexcel 106G are not.

Resistivities measured for these samples further support the observations stated above. It is well known that antistatic chemicals acquire conductivity through absorption of moisture from the air. When acting as a plasticizer for PVC, the antistatic molecules are well bound onto the polymer molecules. As a result, such an antistat-containing PVC structure will possess a more permanent antistatic characteristics and its antistatic property is less sensitive to the humidity of the environment. Resistivity values of Samples 2 and 3 as compared to Samples 4 and 5 in Table IV demonstrate this phenomenon.

EXAMPLE 6

This example illustrates the range of concentrations of antistatic chemical and different antistatic chemicals used in the invention.

TABLE IV

|  | Control 1 | Control 2 | #1 | #2 | #3 | #4 | #5 |
|---|---|---|---|---|---|---|---|
| Fluff Form After Mixing | powder | powder | Lumps | Powder | Powder | Powder | Powder |
| Consolidation Condition | good | good | Not Uniform | Good | Good | Poor* | Poor* |
| Tensile Strength (in PSI) | 656 | N/A | N/A | N/A | 607 | 434 | 382 |
| Elongation (in %) | 8.5 | N/A | N/A | N/A | 10.3 | 5.9 | 6.1 |
| Surface Resist. at 50% RH (ohm/sq) | $3.5 \times 10^{12}$ | $>10^{14}$ | N/A | $1.1 \times 10^8$ | $1.0 \times 10^9$ | $1.5 \times 10^8$ | $9.1 \times 10^8$ |
| Surface Resist. at 15% RH (ohm/sq) | $>10^{14}$ | N/A | N/A | $2.6 \times 10^9$ | $9.5 \times 10^9$ | $4.5 \times 10^{11}$ | $1.8 \times 10^{14}$ |

*Structures in Samples 4 and 5 did not consolidate completely. More specifically, the bottom side (facing the cold plate in the press) did not fuse completely under the processing conditions in these experiments.

Control 1 and Sample 1 were processed and compared. The composition of the two samples were essentially the same, with the exception that Sample 1 contained the Larostat G-13-148. The fluff prepared from Sample 1 was lumpy, indicating that the composition was over plasticized. The consolidated structure of this sample was not uniform. Therefore, the physical properties were not tested.

When the plasticizer of Sample 1 was reduced as in Sample 3, the fluff and the consolidation of this sample behaved similarly as the control. These examples demonstrated that the Larostat G-13-148 acted as a plasticizer in processing the vinyl structure.

When the Hexel 106G (Sample 4) and the Cyastat LS (Sample 5) were used, the structure did not fuse completely, indicating that these two vinyl compositions were not adequately plasticized. Clearly, the Hexcel 106G and the Cyastat LS both were not plascticizing the PVC. The tensile/elongation properties of the samples were also evaluated. As indicated, sample 3 and the control 1 show similar tensile strength, with the elongation of the sample somewhat higher than the control. Samples 4 and 5 were both significantly lower in tensile

| Composition of the examples (in grams) | | | | | | |
|---|---|---|---|---|---|---|
|  | A | B | C | D | E | F (Control) |
| Vinyl fines | 612.5 | 612.5 | 612.5 | 612.5 | 612.5 | 612.5 |
| PVC/PVA resin (10–20% PVA) | 137.5 | 137.5 | 137.5 | 137.5 | 137.5 | 137.5 |
| DOP plasticizer | 19.0 | 21.0 | 7.5 | 22.5 | 10.0 | 22.5 |
| Epoxidized soya oil plasticizer | 8.0 | 12.5 | — | 14.5 | 8.0 | 14.5 |
| Stabilizer | 1.0 | 0.7 | 1.0 | 1.0 | 1.0 | 1.0 |
| Cocoa dihydroxyethyl ethyl ammonium ethylsulfate antistat | 12.0 | 16.3 | 31.5 | — | — | — |
| Larostat 264-A antistat | — | — | — | 21.0 | 21.0 | — |
| % antistat in the composition | 1.5 | 2.0 | 4.0 | 2.6 | 2.7 | 0 |

The processing condition of these samples were basically the same as that given in Example 3. The composition was mixed in a Hobart mixer for ten minutes to obtain a homogeneous powder-like fluff material. The fluff was consolidated between two chromed plates, a 3/32" metal frame was employed to gauge the amount of fluff used in each sample. (The frame was removed prior to the consolidation step.) Consolidation of the fluff materials was done in a press with the top platen preheated to 300° F. and the bottom platen left cold. After slightly pressing the sample at 500 psi for ten seconds, the press was opened and the pressure raised to 1000 psi. Final fusion of the structure was done at 1000 psi for ten seconds. All samples consolidated very well and the final structure showed excellent electrical properties:

|  | A | B | C | D | E | F |
|---|---|---|---|---|---|---|
| Surface Res. at 50% RH (ohms/sq) | $1.2 \times 10^9$ | $7.6 \times 10^8$ | $1.1 \times 10^8$ | $1.1 \times 10^8$ | $3.5 \times 10^8$ | $>10^{14}$ |
| Surface Res. at 15% RH (ohms/sq) | $8.2 \times 10^9$ | $6.8 \times 10^9$ | $4.2 \times 10^9$ | — | — | — |

Antistatic agents of the present invention should perform satisfactorily from 1% to 5% of the composition.

EXAMPLE 7

This example demonstrates the use of quartz particles in place of the vinyl fines (as in the examples given previously) in preparing an antistatic floor structure.

|  | G | H |
|---|---|---|
| Quartz particle (40-100 mesh) | 320.0 | 320.0 |
| PVC/PVA resin (10-20% PVA) | 154.6 | 160.0 |
| DOP plasticizer | 16.0 | — |
| Dibutyl tin maleate | 2.5 | 2.5 |
| Larostat G-13-148 | — | 22.5 |

Sample preparation of these samples was basically the same as that described in Example 3. The consolidation condition, however, was different. The fluff was pressed at 300 psi, 300° F. for ten seconds first, followed by opening the press for 15 seconds and fusing the structure at 3300 psi for ten seconds. The fluff materials from Sample G was laminated on a vinyl base structure containing no carbon black (same composition as that listed in Table I, with limestone replacing the carbon black). Sample H was laminated on a carbon-filled vinyl base as in Example 3. Both Samples G and H consolidated very well both onto the bottom vinyl base layer and on the top fluff material layer. It should be noted that Sample H contained no DOP in the structure. For this composition to have good consolidation, it is necessary that the antistatic chemical be plasticizing the vinyl resin in the structure. The final structure of Sample H had a surface resistivity of $7.0 \times 10^6$ ohms/sq (measured at 40% RG) while Sample H showed a resistivity greater than $10^{14}$ ohms/sq.

What is claimed is:

1. A surface covering comprising a layer including a vinyl resin and an antistatic agent capable of plasticizing said vinyl resin, wherein the antistatic agent is a quaternary ammonium salt having an organic chain ten to twenty-five atoms long selected from the group consisting of soyadimethylethyl ammonium ethosulfate, soya ethyldiammonium ethosulfate and soyadimethylammonium diethylphosphate.

* * * * *